US012806750B2

(12) United States Patent
Saitoh et al.

(10) Patent No.: US 12,806,750 B2
(45) Date of Patent: Nov. 24, 2026

(54) DRIVING TOOL

(71) Applicant: MAKITA CORPORATION, Anjo (JP)

(72) Inventors: Yukio Saitoh, Anjo (JP); Masaya Nagao, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 19/271,316

(22) Filed: Jul. 16, 2025

(65) Prior Publication Data

US 2026/0070201 A1 Mar. 12, 2026

(30) Foreign Application Priority Data

Sep. 9, 2024 (JP) ................................ 2024-154967

(51) Int. Cl.
*B25C 1/04* (2006.01)

(52) U.S. Cl.
CPC .............. *B25C 1/047* (2013.01); *B25C 1/041* (2013.01)

(58) Field of Classification Search
None
See application file for complete search history.

(56) References Cited

U.S. PATENT DOCUMENTS

2021/0101272 A1* 4/2021 Saitou ..................... B25C 1/047
2023/0126083 A1* 4/2023 Baba ....................... B25C 1/047
227/130

FOREIGN PATENT DOCUMENTS

JP 2023-168228 A 11/2023

* cited by examiner

*Primary Examiner* — Daniel Jeremy Leeds
(74) *Attorney, Agent, or Firm* — Oliff PLC

(57) ABSTRACT

When a driver reaches a lower moving end, a first engaging portion engages a first rack tooth of the driver. The first engaging portion has a thinner diameter compared to the other engaging portions, which are the reference engaging portions. During a rebounding motion, a timing at which the first engaging portion enters between the first rack tooth and a second rack tooth is delayed due to the first engaging portion thinner in diameter. In addition, after the first engaging portion enters between the first rack tooth and the second rack tooth, the second rack tooth can be avoided from interfering with the first engaging portion from below due to the rebounding motion.

17 Claims, 8 Drawing Sheets

DRIVING TOOL

CROSS-REFERENCE TO RELATED APPLICATION

This application claims priority to Japanese patent application serial number 2024-154967, filed on Sep. 9, 2024, the contents of which are incorporated herein by reference in their entirety for all purposes.

TECHNICAL FIELD

The present invention generally relates to a driving tool for driving a driving member such as nails or staples into a workpiece such as wood and other materials.

BACKGROUND

For example, a gas spring type driving tool that uses a thrust force of compressed gas as a driving force is well known. The gas spring type driving tool has a piston that moves within a cylinder in an up-down direction and a driver that is coupled to the piston and moves downward together with the piston to drive the driving member. The piston and the driver are moved downward in the driving direction by the pressure of a gas filled in an accumulation chamber. When reaching a lower moving end, the piston collides with a damper to absorb an impact of the collision. The piston and driver are returned from the lower moving end in a direction opposite to the driving direction by a lift mechanism.

The lift mechanism has a lift wheel with a plurality of engaging portions that sequentially engages a plurality of rack teeth arranged on the driver. The lift wheel is rotated by an electric motor. After the driving member such as, for example, a nail is driven by the driver, the engaging portions of the lift wheel sequentially engage the rack teeth of the driver, which causes the driver to move upward in a direction opposite to the driving direction. The upward movement of the piston in the direction opposite to the driving direction increases the pressure of the gas in the accumulation chamber. When the driver is moved upward to an upper moving end, the engagement of the lift mechanism with the driver is released. As a result, the driver moves downward by the gas pressure to drive a next driving member.

SUMMARY OF THE DISCLOSURES

In this type of driving tools, quick-firing performance (capacity) can be improved by performing the return operation by the lift mechanism in a short time after the driver has reached the lower moving end. However, the piston repeatedly undergoes a rebounding motion (bouncing motion) by moving in the up-down direction several times due to its contact (collision) with the damper at the lower moving end. Therefore, when the return movement of the lift mechanism is accelerated to improve rapid-fire performance (capacity), the bouncing action of the piston tends to cause the rack teeth of the driver to contact and collide with the engaging portion of the lift wheel from below. This may damage the durability of the lift mechanism. Thus, there is a need to improve both the rapid firing performance of the driving tool and the durability of the lift mechanism.

According to one aspect of the present disclosure, a driving tool has a piston that is actuated by gas pressure to move in a driving direction, and a driver attached to the piston and moving together with the piston for driving a driving member. The driving tool has rack teeth arranged in the driver along the driving direction, and a wheel with engaging portions. The wheel moves the driver in a direction opposite to the driving direction by sequentially engaging the engaging portions with corresponding rack teeth during its rotation. Further, the engaging portions include a first engaging portion and three or more reference engaging portions thicker than the first engaging portion. The first engaging portion engages a first rack tooth positioned farthest (outermost) in the direction opposite to the driving direction among the rack teeth.

Because of this configuration, a timing at which the first engaging portion starts to engage the first rack tooth due to rotation of the wheel is delayed compared to a case where the first engaging portion is the same thickness as the other engaging portions. Accordingly, the second rack tooth in the adjoining area of the first rack tooth on the driving direction side of the first rack tooth can be prevented from interfering with the first engaging portion during the rebounding motion. Therefore, rapid-fire performance of the driving tool (e.g., a rotational speed of the wheel) can be improved without deteriorating durability of the lift mechanism including the wheel.

DETAILED DESCRIPTION

Figure 1:
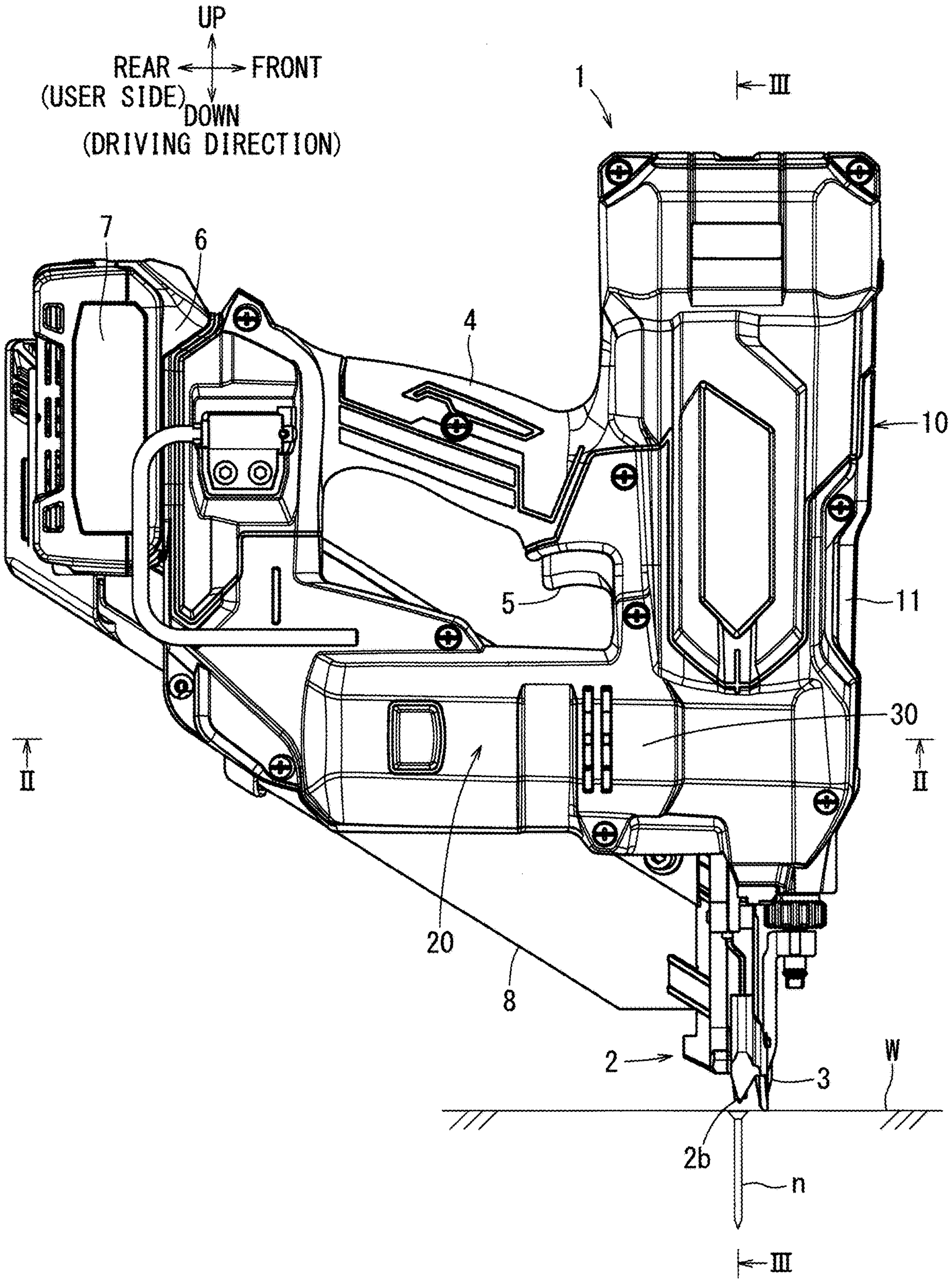
FIG. 1 is an overall perspective view of a driving tool according to an embodiment of the present disclosure.

The detailed description set forth below, when considered with the appended drawings, is intended to be a description of exemplary embodiments of the present disclosure and is not intended to be restrictive and/or representative of the only embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the disclosure. It will be apparent to those skilled in the art that the exemplary embodiments of the disclosure may be practiced without these specific details. In some instances, these specific details refer to well-known structures, components, and/or devices that are shown in block diagram form in order to avoid obscuring significant aspects of the exemplary embodiments presented herein.

According to another aspect of the present disclosure, the plurality of engaging portions includes a last engaging portion that engages a last rack tooth positioned farthest (outermost) in the driving direction among the rack teeth. The wheel includes a relief portion along a circumferential direction of the wheel between the first engaging portion and the last engaging portion. The relief portion on the wheel allows smooth movement of the driver in the driving direction. The relief portion is within an angle range that is greater than an angle at which the driver is allowed to move in the driving direction and less than 110° around a rotational axis of the wheel. Because of this configuration, by setting the size of the relief portion smaller, a travel distance (lift amount) of the driver due to rotation of the wheel can be enlarged without increasing a size of the wheel.

According to another aspect of the present disclosure, the wheel has five to ten engaging portions. Accordingly, the driver is returned in the direction opposite to the driving direction by sequentially engaging the five to ten engaging portions with the corresponding rack teeth.

According to another aspect of the present disclosure, the wheel rotates 3.5 to 7 revolutions per second, ensuring high rapid-fire capacity.

According to another aspect of the present disclosure, the driving tool also has a damper that the piston collides with at a lower moving end of the piston. The first engaging portion engages the first rack tooth after an end of a rebounding motion moving in the direction opposite to the driving direction due to the collision with the damper at the lower moving end. Accordingly, the first engaging portion, which enters a side of the first rack tooth in the driving direction due to rotation of the wheel, can be reliably prevented from interfering with the second tack tooth from a side opposite to the driving direction.

According to another aspect of the present disclosure, the first engaging portion has a diameter that avoids interference with a second rack tooth, which is located in an adjoining area of the first rack tooth in the driving direction, when the driver moves in the direction opposite to the driving direction. Due to the sufficiently small diameter of the first engaging portion, the rapid-fire performance (capacity) of the driving tool (e.g., a rotational speed of the wheel) can be improved without compromising the durability of the lift mechanism, including the wheel.

According to another aspect of the present disclosure, the damper is made of rubber with durometer hardness of 85±5. Accordingly, the rebounding motion of the driver is suppressed to ensure rapid-fire performance of the driving tool.

According to another aspect of the present disclosure, the driver includes a second rack tooth in an adjoining area of the first rack tooth on a side in the driving direction, and a tooth width of the second rack tooth is reduced by chipping off a part of the second tack tooth on a side opposite to the driving direction. Accordingly, the first engaging portion can be reliably avoided from interfering with the second rack tooth.

According to another aspect of the present disclosure, a tooth height of the second rack tooth, which is in an adjoining area of the first rack tooth on a side in the driving direction, is lower than those of other rack teeth. Accordingly, the first engaging portion can be reliably avoided from interfering with the second rack tooth.

According to another aspect of the present disclosure, the plurality of rack teeth of the driver is arranged at equal intervals in a longitudinal direction of the driver and the plurality of engaging portions of the wheel is arranged at equal intervals around an outer circumferential edge of the wheel. Accordingly, each of the engaging portions equally engages the corresponding rack tooth in a sequential manner to return the driver in the direction opposite to the driving direction.

Next, an embodiment of the present disclosure will be described with reference to FIGS. 1 to 8. As an example of a driving tool 1, a gas spring type driving tool 1 is shown which uses the pressure of the gas filled in the accumulation chamber as a thrust force for driving a driving member n. In the following description, a driving direction of the driving member n is a downward direction and a direction opposite to the driving direction is an upward direction. A user of the driving tool 1 is generally situated on a rear side of the driving tool 1 in FIG. 1, which is referred to as a user side. A nearer side of the user is referred to as a rearward direction and a direction opposite to the rearward direction is a forward direction. A leftward/rightward direction is based on the user's position.

As shown in FIGS. 1 to 4, the driving tool 1 has a tool main body 10. The tool main body 10 has a cylinder 12 that is housed in a main body housing 11. The main body housing 11 is formed generally in a cylindrical shape. A piston 13 is housed within the cylinder 12 so as to be reciprocatable in an up-down direction. An upper portion of the cylinder 12 above the piston 13 communicates with an accumulation chamber 14. The accumulation chamber 14 is filled with compressed gas such as, for example, air. The gas pressure in the accumulation chamber 14 acts on an upper surface of the piston 13 as a thrust force to move the piston 13 downward.

Figure 3:
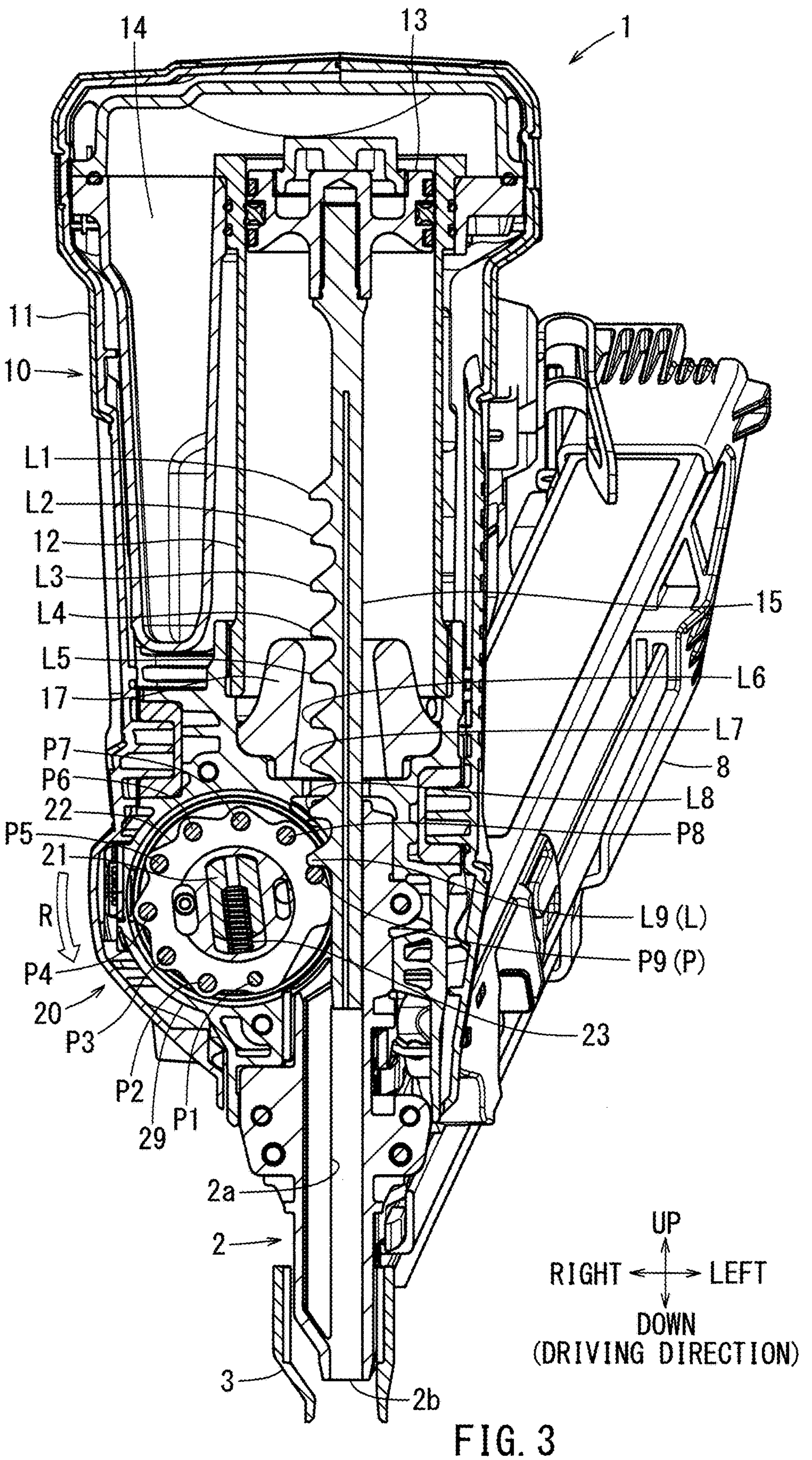
FIG. 3 is a cross-sectional view taken along line III-III of FIG. 1, showing a driver is at a standby position.
Figure 4:
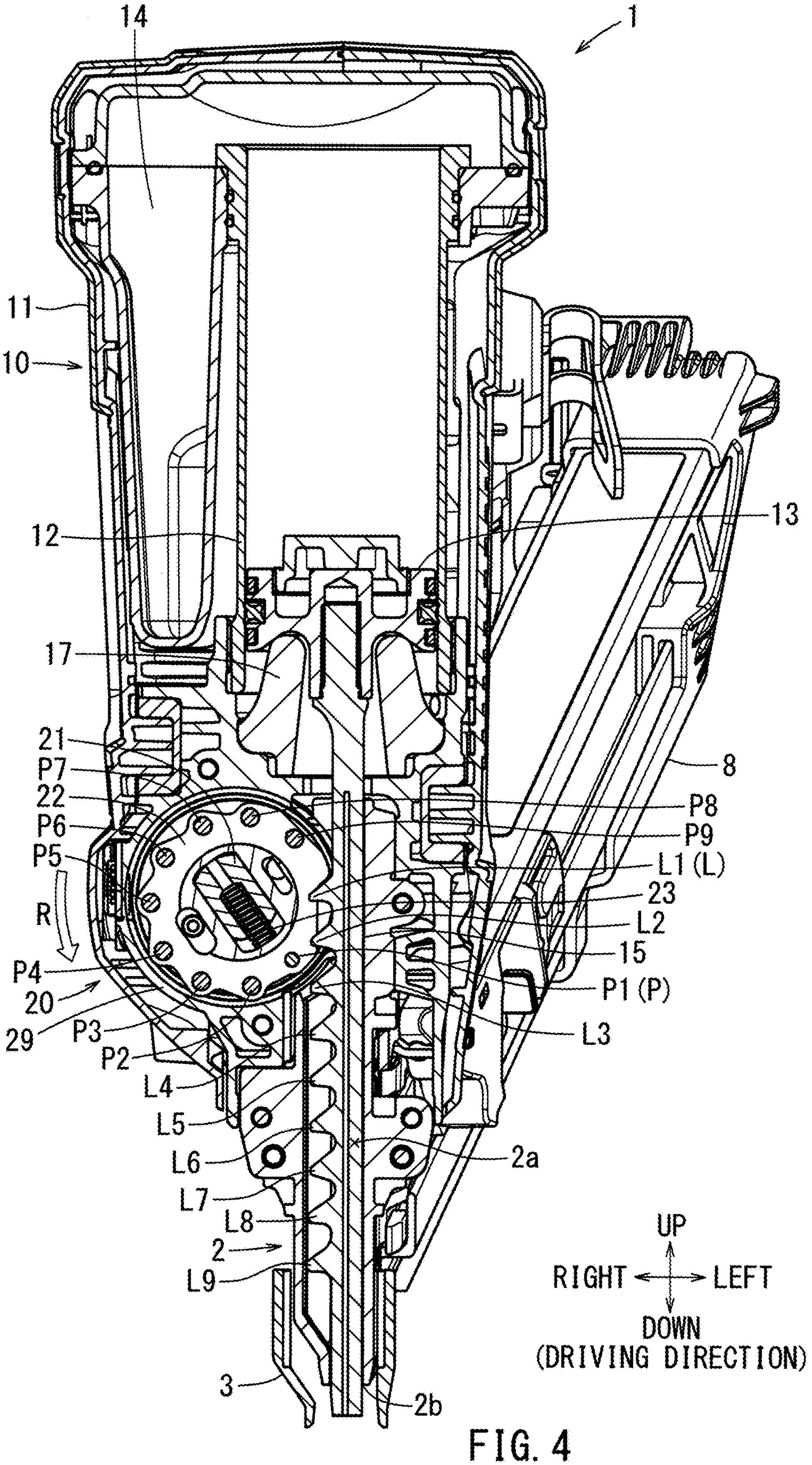
FIG. 4 is a longitudinal cross-sectional view of a tool main body, showing the driver is at a lower moving end.
Figure 5:
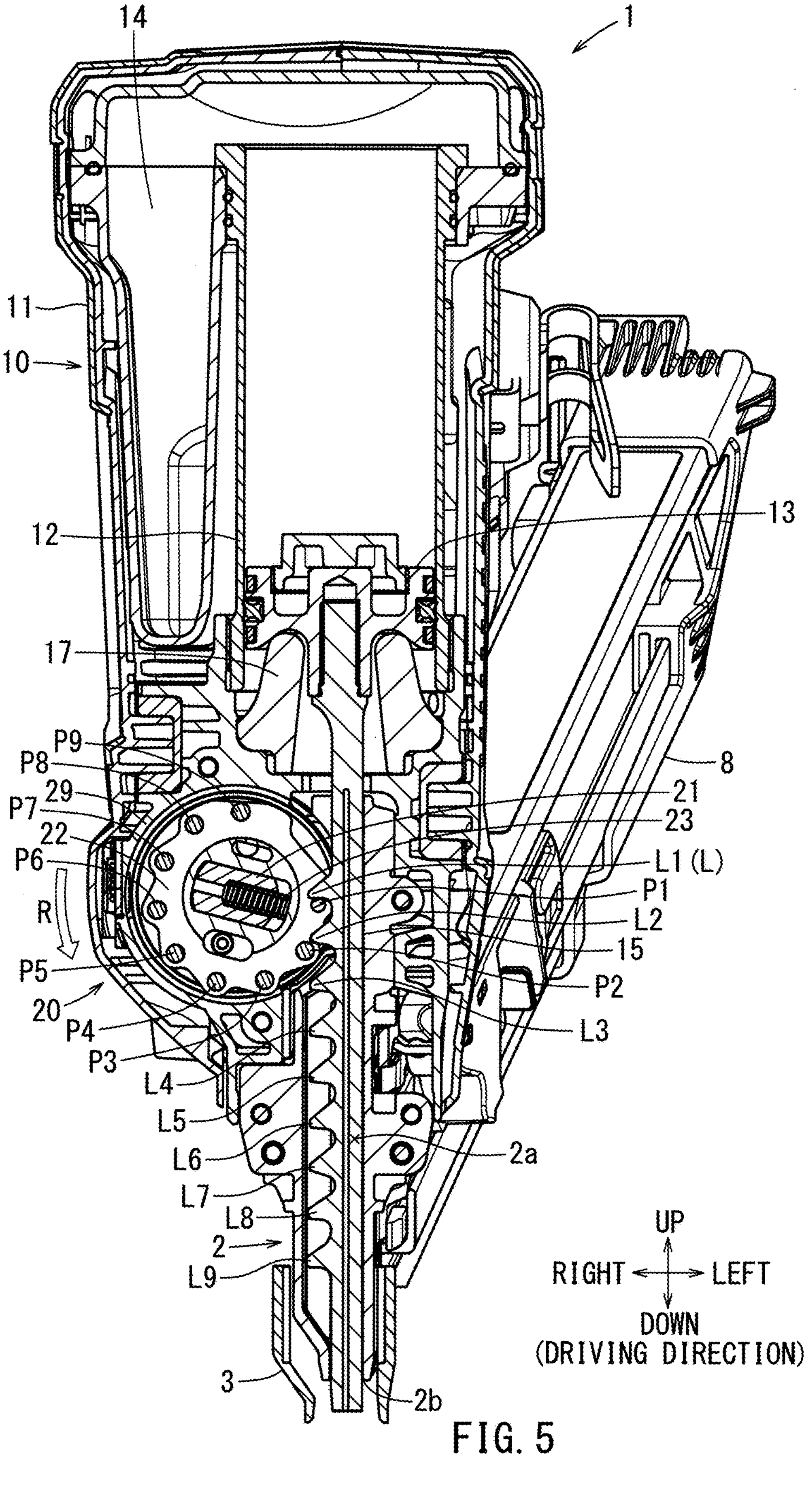
FIG. 5 is a longitudinal cross-sectional view of the tool main body, showing a first engaging portion engages a lower surface of a first rack tooth.

As shown in FIGS. 3 and 4, a lower portion of the cylinder 12 communicates with a driving passage 2*a* of a driving nose 2 that is formed at a lower portion of the tool main body 10. The driving nose 2 is coupled to a magazine 8 which is loaded with a number of driving members n (refer to FIG. 1). The driving members n, which extend in the up-down direction, are supplied to the driving passage 2*a* from the magazine 8 one by one. At a bottom portion of the driving nose 2, a contact arm 3 is arranged so as to be movable in the up-down direction with respect to the nose 2. The contact arm 3 moves upward relative to the driving nose 2 by contacting a workpiece W.

A driver 15 connects a lower surface of the piston 13 and extends in the up-down direction. A lower portion of the driver 15 enters the driving passage 2*a*. The driver 15 moves downward within the driving passage 2*a* due to the pressure of the gas in the accumulation chamber 14 acting on the upper surface of the piston 13. A lower end of the driver 15 drives one driving member n supplied into the driving passage 2*a*. The driving member n driven by the driver 15 is ejected from an ejection port 2*b* of the driving nose 2. The ejected driving member n is driven into the workpiece W.

A damper 17 is located at the bottom of the cylinder 12 and absorbs the impact when the piston reaches its lower moving end during the driving operation. This prevents damage to the tool components. The damper 17 is made of rubber and has a cylindrical shape. The damper 17 has the durometer hardness of, for example, about 85 based on JIS-K-6253. The hardness of the damper 17 can be adjusted within the range of (85±5). The adjustable damper hardness suppress a rebounding motion B. The damper 17 with such hardness can avoid collision of a rack tooth L2 of the driver 15 with an engaging portion P1 of a wheel 22. The collision with the rack tooth L2 with the engaging portion P1 will be discussed later. The driver 15 enters an inner circumference of the damper 17. When the piston 13 reaches the lower moving end, the driver 15 drives the driving member n. At the same time, the piston 13 collides with the damper 17.

After the piston 13 contacts the damper 17, it undergoes the rebounding motion B (small up-down movements) due to the elastic force of the damper 17. The driver 15 also makes the rebounding motion B together with the piston 13. The collision energy occurred when the piston 13 collides with the damper 17 is absorbed after several rebounding motions B, and the piston 13 stops at the lower moving end. After the piston 13 completely stops at the lower moving end, or in the middle of the rebounding motion B, the piston 13 and driver 15 return upward to a standby position by the lift mechanism 20. The lift mechanism 20 will be described later. FIG. 3 shows the piston 13 and the driver 15 return to the standby position. In the standby position, when the driver 15 is moved further upward to an upper moving end by rotation of the wheel 22, the engaging portion P of the wheel 22 disengages from the rack teeth L of the driver 15. The disengagement of the engaging portion P from the rack teeth L causes the piston 13 to move downward due to the gas pressure acting on the upper surface of the piston 13. Accordingly, the driver 15 moves downward in the driving direction to drive a driving member n (perform a driving operation).

As shown in, for example, FIG. 3, a plurality of rack teeth L are arranged on a right side of the driver 15. Each rack tooth L is positioned at regular intervals in a longitudinal direction (up-down direction) of the driver 15. Each rack tooth L protrudes rightward from the driver 15. In the embodiment, nine rack teeth L1-L9 are arranged in the driver 15. Hereafter, the nine rack teeth L1-L9 are also referred to as a first rack tooth L1, a second rack tooth L2, a third rack tooth L3, a fourth rack tooth L4, a fifth rack tooth L5, a sixth rack tooth L6, a seventh rack tooth L7, an eighth rack tooth L8, and a last rack tooth L9, in sequentially order starting from the top as necessary. The nine tack teeth L sequentially engage the engaging portions P arranged in the lift mechanism 20.

As shown in FIG. 1, a grip 4, which is held by a user, is arranged at a rear portion of the tool main body 10. A trigger 5 is arranged on a front lower surface of the grip 4. The user pulls the trigger 5 with a fingertip to activate the driving tool 1. A pulling operation of the trigger 5 is enabled by pressing the contact arm 3 against the workpiece W and moving the contact arm 3 upward relative to the driving nose section 2. A battery attachment portion 6 is arranged at a rear portion of the grip 4. A battery pack 7 can be removably attached to a rear surface of the battery attachment portion 6. The battery pack 7 can be removed from the battery attachment portion 6 by sliding the battery pack 7 upward with respect to the battery attachment portion 6. The battery pack 7 removed from the battery attachment portion 6 can be recharged by a dedicated charger for repeated use. Power from the battery pack 7 is supplied to the lift mechanism 20.

As shown in FIG. 3, the lift mechanism 20 is arranged on a right side of the driving nose 2. The lift mechanism 20 has a function of returning the piston 13 together with the driver 15 upward to the standby position after driving the driving member n. When the piston 13 returns upward by the lift mechanism 20, the gas pressure in the accumulation chamber 14 increases.

As shown in FIG. 1, the lift mechanism 20 is housed in a cylindrical lift housing 30. The lift housing 30 is integrally formed at the lower portion of the main body housing 11. The battery attachment portion 6 straddles between the rear portion of the lift housing 30 and the rear portion of the grip 4.

Figure 2:
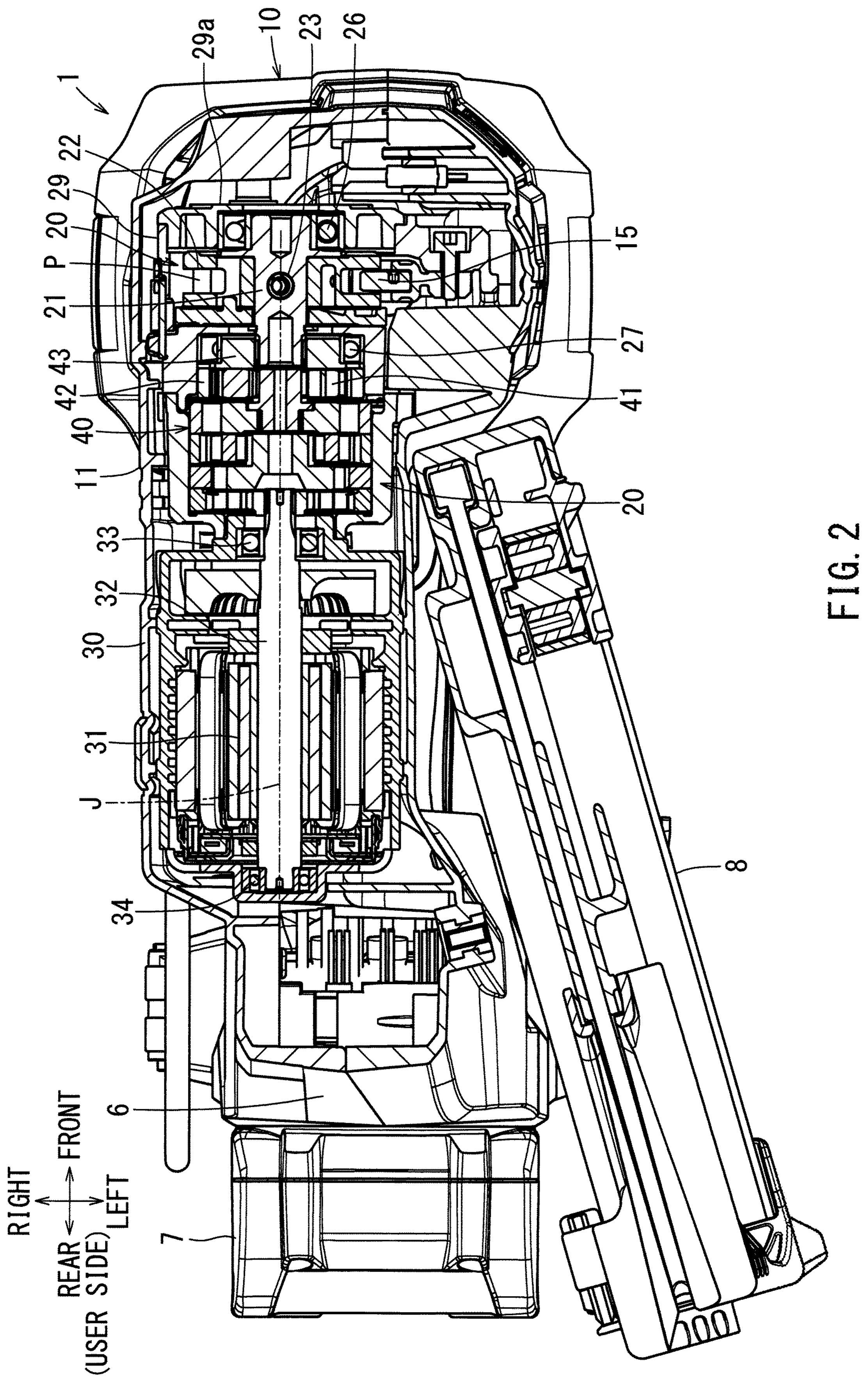
FIG. 2 is a cross-sectional view taken along line II-II of FIG. 1, showing a lateral cross-sectional view of a lift mechanism.

As shown in FIG. 2, the lift mechanism 20 has an electric motor 31 serving as a driving source. The electric motor 31 is housed in the lift housing 30 such that an output shaft 32 of the electric motor 31 (motor axis J) is aligned with the front-rear direction. Because of this arrangement, the motor axis J is perpendicular to the driving direction (a direction perpendicular to the sheet in FIG. 2). The electric motor 31 is activated by a pulling operation of the trigger 5 by using electric power of the battery pack 7 serving as the power source.

As shown in FIG. 2, the output shaft 32 of the electric motor 31 is rotatably supported by the lift housing 30 via bearings 33 and 34. A front portion of the output shaft 32 is connected to a reduction gear 40. Three planetary gear trains are used in the reduction gear 40. The three planetary gear trains are mutually coaxial and aligned with the motor axis J. A rotational output of the electric motor 31 is reduced by the reduction gear 40, which includes the three planetary gear trains, and is directed forward to the lift mechanism 20.

The lift mechanism 20 has a rotation shaft 21, which is connected to the reduction gear 40, and a wheel 22 supported by the rotation shaft 21. The lift mechanism 20 is housed in a mechanism case 29 that is formed in approximately a cylindrical shape. The mechanism case 29 is housed in the lift housing 30. A rotation shaft line (rotation center C) of the rotation shaft 21 is aligned with the motor axis J. A front portion of the mechanism case 29 is covered by a lid 29*a*. A front end of the rotation shaft 21 is rotatably supported by the lid 29*a* via a bearing 26. A rear end of the rotation shaft 21 is coupled to a carrier 43 of the last stage of the reduction gear 40. The carrier 43 of the last stage of the reduction gear 40 is rotatably supported by the mechanism case 29 via a bearing 27 on the outer circumference of the carrier 43. A plurality of planetary gears 41 are supported on the carrier 43. The plurality of planetary gears 41 engage an internal gear 42.

When the electric motor 31 is activated, the rotation shaft 21 and the wheel 22 of the lift mechanism 20 rotate together in a direction indicated by an arrow R shown in FIG. 3 (counterclockwise in FIG. 3). When the wheel 22 rotates in the direction indicated by the arrow R (in the direction R), the driver 15 moves upward.

Figure 6:
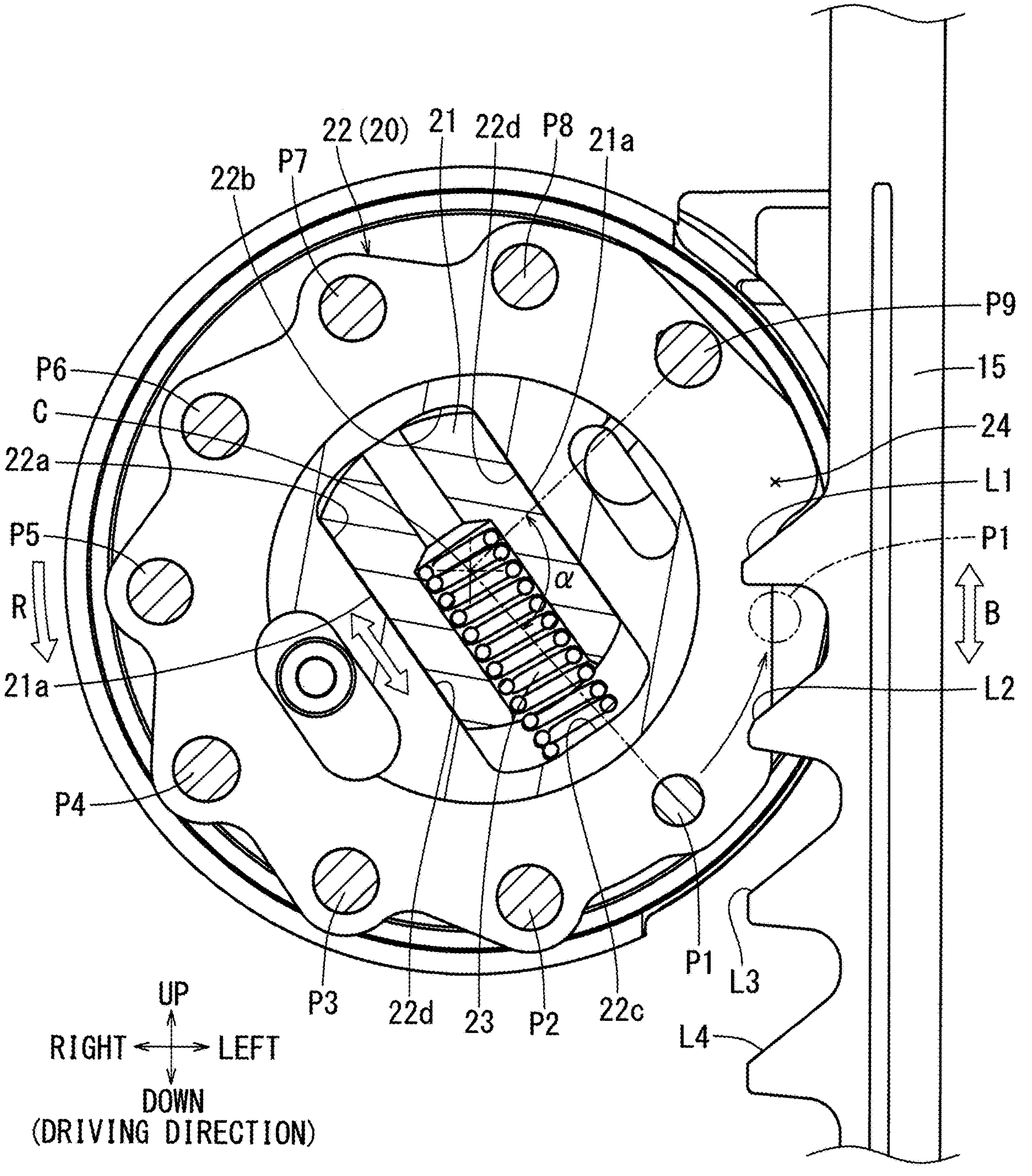
FIG. 6 is an enlarged view of a wheel and a driver, showing a state before the first engaging portion enters between the first rack tooth and a second rack tooth. The first engaging portion entering between them is indicated by two-dotted chain line.

As shown in FIG. 6, the wheel 22 has engaging portions P that engage the rack teeth L of the driver 15 sequentially during the wheel's rotation. The plurality of engaging portions P are arranged at regular intervals along an outer circumferential edge of the wheel 22. In the present embodiment, for example, nine engaging portions P (P1-P9) are arranged on the wheel 22. A cylindrical-shaped shaft member (pin) is used for each of the engaging portions P. In the following explanation, the nine engaging portions P are referred to as a first engaging portion P1, a second engaging portion P2, a third engaging portion P3, a fourth engaging portion P4, a fifth engaging portion P5, a sixth engaging portion P6, a seventh engaging portion P7, an eighth engaging portion P8, and the last engaging portion P9, in sequentially order starting from a leading side in the rotation direction R of the wheel 22.

The nine engaging portions P1 to P9 are positioned in an area of approximately three-fourths of the circumferential edge of the wheel 22. The second engaging portion P2 is positioned in the adjoining area of the first engaging portion P1 in a direction opposite to the rotation direction R of the wheel 22. The third engaging portion P3 to the last engaging portion P9 are positioned in sequential order in the same manner in the direction opposite to the rotation direction R of the wheel 22. A remaining portion of the circumferential edge of the wheel 22 (an area between the first engaging portion P1 and the last engaging portion P9) is referred to as a relief portion 24. The engaging portions P1 to P9 are not disposed in the relief portion 24. The relief portion 24 is formed in an area where an angle α, which is shown in FIG. 6, is, for example, 96.4° around a center of the rotation shaft line of the wheel 22 (rotation center C). The area of the relief portion 24 can be changed within a range of, for example, 110° or less. As shown in FIG. 6, interference between the engaging portion P of the wheel 22 and the rack tooth L of the driver 15 is avoidable because the relief portion 24 faces the driver 15 when the driver 15 moves upward. Because of this configuration, a smooth movement (driving operation) of the driver 15 is allowed in the driving direction.

As shown in FIG. 6, the wheel 22 is supported by the rotation shaft 21 via a support hole 22*a* formed in an elongated hole shape. The support hole 22*a* has two opposing arc-shaped inner surfaces (circular inner surfaces 22*b*, 22*c*) and two parallel flat surfaces 22*d* located between the two circular inner surfaces 22*b*, 22*c*. The flat surfaces 22*d* of the support hole 22*a* slidably engages the flat surfaces 21*a* of the rotation shaft 21. Accordingly, as indicated by a white arrow in FIG. 6, the wheel 22 is supported to be movable within a predetermined range with respect to the rotation shaft 21 in a radial direction of the wheel 22. The wheel 22 is movably supported between a normal position and a displacement (retreated) position. At the normal position, the first circular inner surface 22*b* of the support hole 22*a* contacts the rotation shaft 21. At the displacement position, a gap is created between the first circular inner surface 22*b* of the support hole 22*a* and the rotation shaft 21, and the second circular inner surface 22*c* contacts the rotation shaft 21. FIG. 6 illustrates the wheel 22 in the normal position.

A displacement direction of the wheel 22 relative to the rotation shaft 21 generally coincides with a direction in which the first engaging portion P1 is moved closer to or away from the rack teeth L of the driver 15 when the wheel 22 is rotated to a position where the first engaging portion P1 engages the rack teeth L of the driver 15 (a position shown by two-dotted chain line in FIG. 6).

A compression spring 23 is held between the second circular inner surface 22*c* of the support hole 22*a* and the rotation shaft 21. The wheel 22 is positioned such that the first pin P1 of the wheel 22 is in a direction away from the rotation shaft 21 (on a side of the normal position) by a biasing force of the compression spring 23. In other words, when the first engaging pin P1 engages the rack tooth L, the wheel 22 is positioned such that the first engaging pin P1 of the wheel 22 is in a direction closer to the rack tooth L by the biasing force of the compression spring 23.

For example, if the driver 15 stops before reaching the lower moving end due to nail jamming or insufficient driving force, the first engaging portion P1 moves away from the rack teeth L to avoid a state of interference (engagement lock) of the first engaging portion P1 with respect to the rack teeth L. In more detail, when the driver 15 stops before reaching the lower moving end due to a nail jam, etc., and the first engaging portion P1 interferes with a head of the second rack tooth L2, the gas pressure in the accumulation chamber 14 added to the wheel 22 via the first engaging portion P1 causes the wheel 22 to displace to the displacement position (retreated position) against the compression spring 23. Because of this movement, interference of the first engaging portion P1 with the second rack tooth L2 can be avoided, thereby engaging the first engaging portion P1 with the lower surface of the first rack tooth L1 in a normal manner. Accordingly, after the engagement lock state is avoided, the driver 15 is returned upward by the normal engagement. This facilitates removal of jammed nails.

The wheel 22 rotates approximately three-fourths of a turn to move the driver 15 upward from the lower moving end, through the standby position, to the upper moving end. During this rotation, the gas pressure in the accumulation chamber 14 acts on each engaging portion P of the wheel 22 via the respectively rack tooth L of the driver 15. It is configured such that a component of the total thrust force of the gas pressure, in a sliding direction between the flat surface 22*d* of the support hole 22*a* and the flat surface 21*a* of the rotation shaft 21, acts to push the wheel 22 downward in the driving direction.

During one rotation of wheel 22, the gas pressure acting on each engaging portion P causes the wheel 22 to move between the normal position and the displacement position. In a rotational region from the standby position shown in FIG. 3 (where the last engaging portion P9 engages the last rack tooth L9) to the position where the first engaging portion P1 engages the first rack tooth L1 shown in FIG. 5 (the region of the relief portion 24), the wheel 22 is held in the normal position by the biasing force of the compression spring 23. When the second engaging portion P2 to the eighth engaging portion P8 of wheel 22 engages the corresponding the rack tooth L, the wheel 22 is displaced to the displacement position against the biasing force of the compression spring 23 due to the gas pressure added via the rack teeth L.

The engagement depth of each engaging portion P with respect to the corresponding rack tooth L slightly changes as the wheel 22 moves between the normal and displacement positions during a single rotation of the wheel 22. In the present embodiment, for example, the second engaging portion P2 to the fifth engaging portion P5 are slightly displaced toward a side of the outer circumference of the wheel 22, relative to the first engaging portion P1 and the sixth engaging portion P6 to the last engaging portion P9 to absorb the change in depths of engagement with the rack teeth L. Because of this configuration, each engaging portion P engages its corresponding rack tooth L at an equal depth and at an equal timing as the driver 15 moves upward to the standby position. This movement is achieved by rotating the wheel 22 around the motor axis line J (rotation center C), with the wheel 22 displacing radially relative to the rotation shaft 21. Accordingly, the driver 15 smoothly returns to the standby position.

When the wheel 22 has a support structure that allows displacement of the wheel 22 in the radial direction with respect to the rotation shaft 21 to prevent nail jamming, etc., shifting some of the plurality of engaging portions P toward the inner circumference or the outer circumference causes the engaging portions P to engage the corresponding rack teeth L at an even timing, thereby obtaining a smooth return movement of the driver 15. Instead, by changing angles between the engaging portions P, lengths between the rack teeth L, or groove depths between the rack teeth L can achieve the same results as described above.

After the driver 15 moves to the lower moving end to drive a driving member n in a normal manner as shown in FIG. 4, the wheel 22 continues to rotate in the direction indicated by the arrow R to return the driver 15 upward.

Referring to FIG. 6, when the first engaging portion P1 enters a lower side of the first rack tooth L1 by rotation of the wheel 22 after the driving member n is driven, it can be anticipated that the driver 15 is displaced upward by the rebounding motion B. When the first engaging portion P1 enters between the first rack tooth L1 and the second rack tooth L2 that are displaced upward by the rebounding motion B, it is anticipated that the second rack tooth L2 collides with the first engaging portion P1 from below. In this case, an impact in the opposite direction of the driving direction is added to the carrier 43 of the last stage of the reduction gear 40 coupled to the wheel 22. Because of this movement, durability of the planetary gear 41 and the internal gear 42 of the last stage supported by the carrier 43 may be damaged.

In the present embodiment, the first engaging portion P1 is the thinnest engaging portion compared to the other engaging portions P2 to P9 in order to avoid collision of the second rack tooth L2 with the first engaging portion P1. In this embodiment, the second engaging portion P2 to the last engaging portion P9 are referred to as reference engaging portions. For example, the first engaging portion P1 has a diameter of 3.5 mm, and the reference engaging portions P2 to P9 each has a diameter of 4.5 mm. In this manner, the first engaging portion P1 is 1 mm thinner in diameter than the second to last engaging portions P2 to P9. The thinner first engaging portion P1 increases a distance between the first engaging portion P1 and the last engaging portion P9. Because of this configuration, the timing at which the first engaging portion P1 engages the first rack tooth L1 of the driver 15 is delayed.

Furthermore, the first engaging portion P1 is thinner than the other engaging portions P2 to P9, preventings the second rack tooth L2 from colliding with the first engaging portion P1 from below. Accordingly, the impact on the wheel 22 can be reduced, thereby increasing its durability. In addition, the impact on the reduction gear 40 via the wheel 22 is reduced, thereby increasing durability of the reduction gear 40.

Furthermore, the timing at which the first engaging portion P1 enters the lower surface of the first rack tooth L1 is delayed because the first engaging portion P1 is thinner than the other engaging portions P2 to P9. Because of this configuration, the second rack tooth L2 can be prevented from colliding with the first engaging portion P1 from below.

In this manner, the engagement of the first engaging portion P1 with the rack teeth L during the rebounding motion B of the driver 15 is allowed without deteriorating durability of the wheel 22 and the reduction gear portion 40, thereby increasing a rotation speed of the wheel 22 and ensuring rapid-firing capability of the driving tool 1. In this embodiment, the wheel 22 rotates at 3.5 to 7 revolutions per second to ensure high rapid-firing performance while durability of the wheel 22 and the reduction gear 40 are sufficiently ensured.

A reference position of the first engaging portion P1 is a position where the first engaging portion P1 contacts the lower surface of the first rack tooth L1 without interfering with the second rack tooth L2 immediately after the rebounding motion B of the driver 15 ends. Without changing this reference position of the first engaging portion P1, the engagement of the first engaging portion P1 with the first rack tooth L1 can be achieved by reducing the diameter of the first engaging portion P1 while avoiding interference with the second rack tooth L2 during the rebounding motion B of the driver 15.

According to the present embodiment, the lift mechanism 20 is configured such that the first engaging portion P1, which engages the first rack tooth L1 positioned farthest (outermost) in the driving direction, has the thinnest diameter compared to the other engaging portions P. Accordingly, the timing at which the first engaging portion P1 begins to engage the first rack tooth L1 due to rotation of the wheel 22 is delayed compared to a case where the first engaging portion P1 is the same thickness as the other engaging portions P. Because of this configuration, the second rack tooth L2, located in the adjoining area of the first rack tooth L1 on the driving direction side of the first rack tooth L1, can be prevented from interfering with the first engaging portion P1 during the rebounding motion B. Accordingly, rapid-fire performance of the driving tool 1 (e.g., a rotational speed of the wheel 22) can be increased without compromising (deteriorating) durability of the lift mechanism 20, including the wheel 22.

According to the present embodiment, the plurality of engaging portions P has a last engaging portion P9 that engages the last rack tooth L9 that is positioned farthest (outermost) in the driving direction among the plurality of rack teeth L. The relief portion 24 is formed within an angle range of 110° or less between the first engaging portion P1 and the last engaging portion P9, with the rotation shaft line of the wheel 22 as the rotation center C. The driver 15 is allowed to move in the up-down direction in the relief portion 24. Accordingly, by setting the size of the relief portion 24, which allows movement of the driver 15, smaller, a travel distance (lift amount) of the driver 15 due to rotation of the wheel 22 can be enlarged.

According to the present embodiment, the first engaging portion P1 is thinner than other engaging portions Pm delaying its engagement5 with the rack tooth L1 compared to when the first engaging portion P is the same thickness as the other engaging portions. After the rebounding motion B of the driver 15 ends, the first engaging portion P1 engages the first rack tooth L1. Accordingly, the first engaging portion P1, which enters a side of the first rack tooth L1 in the driving direction due to rotation of the wheel 22, can be reliably prevented from interfering with the second tack tooth L2 from a side opposite to the driving direction.

According to the present embodiment, the rotation speed of the wheel 22 is 3.5 to 7 revolutions per second. Accordingly, higher rapid-fire performance of the driving tool 1 can be obtained.

According to the present embodiment, the diameter of the first engaging portion P1 is such that interference with the second rack tooth L2, which is in the adjoining area of the first rack tooth L1 in the driving direction, can be avoided when the driver 15 moves in the direction opposite to the driving direction. Because of the small diameter of the first engaging portion P1 in a sufficient manner, the rapid-fire performance of the driving tool 1 (e.g., a rotational speed of the wheel 22) can be increased without deteriorating durability of the lift mechanism 20 including the wheel 22.

According to the present embodiment, the damper 17 is made of rubber with a durometer hardness of 85±5. Accordingly, the rebounding motion B of the driver 15 is suppressed to ensure the rapid-fire performance of the driving tool 1.

Figure 7:
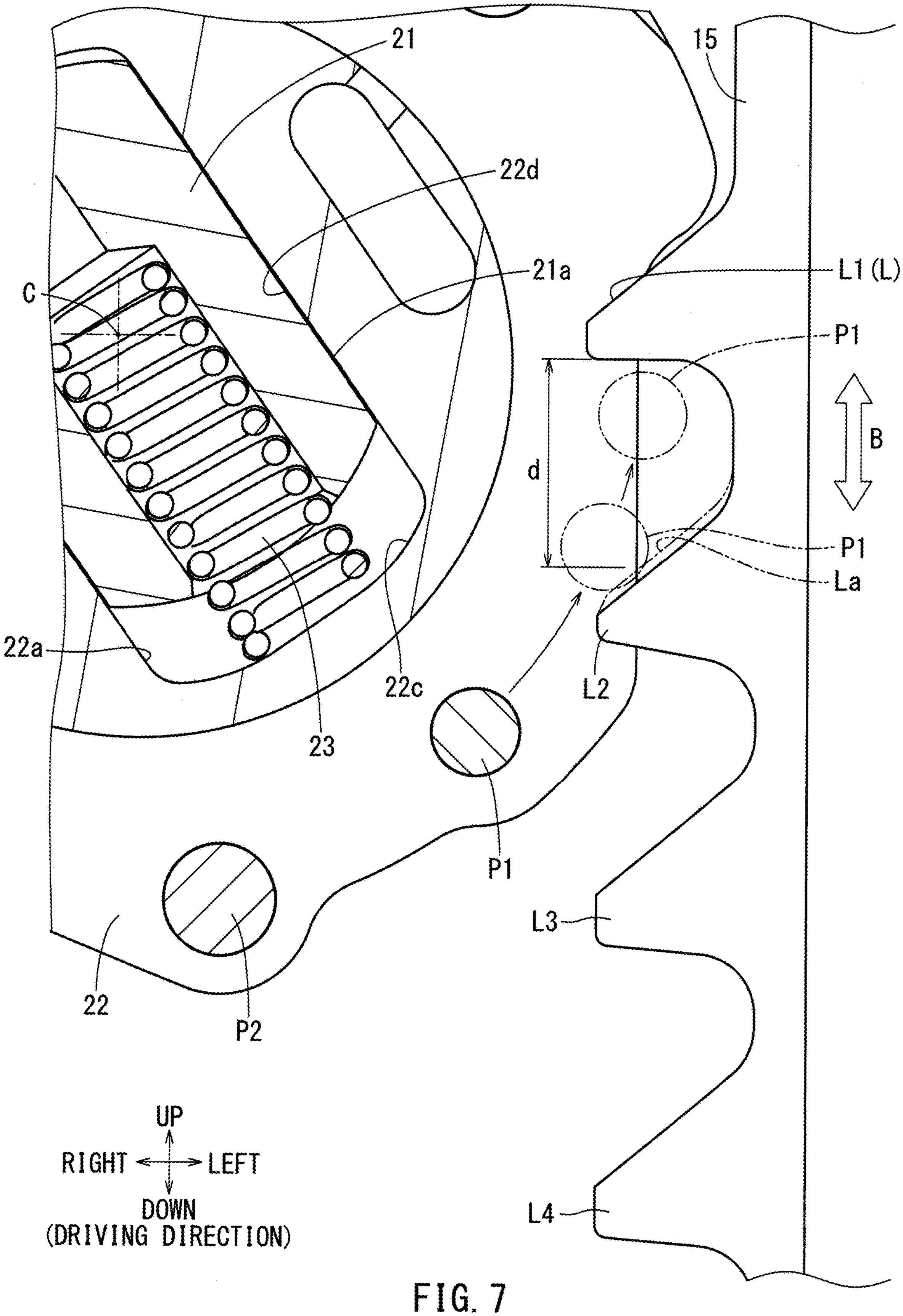
FIG. 7 is an enlarged view of the wheel and the driver, showing an upper portion of the second rack tooth is chipped off to make a groove width between the first rack tooth and the second rack tooth larger than those between the other rack teeth.

For another example, as shown by the two-dotted chain line in FIG. 7, a tooth width of the second rack tooth L2 is reduced by chipping off a portion of the second rack tooth L2 on a side opposite to the driving direction (upper surface La) such that a groove width d on a pitch reference line between the first rack tooth L1 and the second rack tooth L2 can be larger than the groove widths between the other rack teeth L. Because of this configuration, interference or collision of the second rack tooth L2 with the first engaging portion P1 can be reliably avoided during the rebounding motion B of the driver 15. Accordingly, the rapid-fire performance of the driving tool 1 (e.g., the rotational speed of the wheel 22) can be increased without deteriorating durability of the lift mechanism 20 including the wheel 22.

Figure 8:
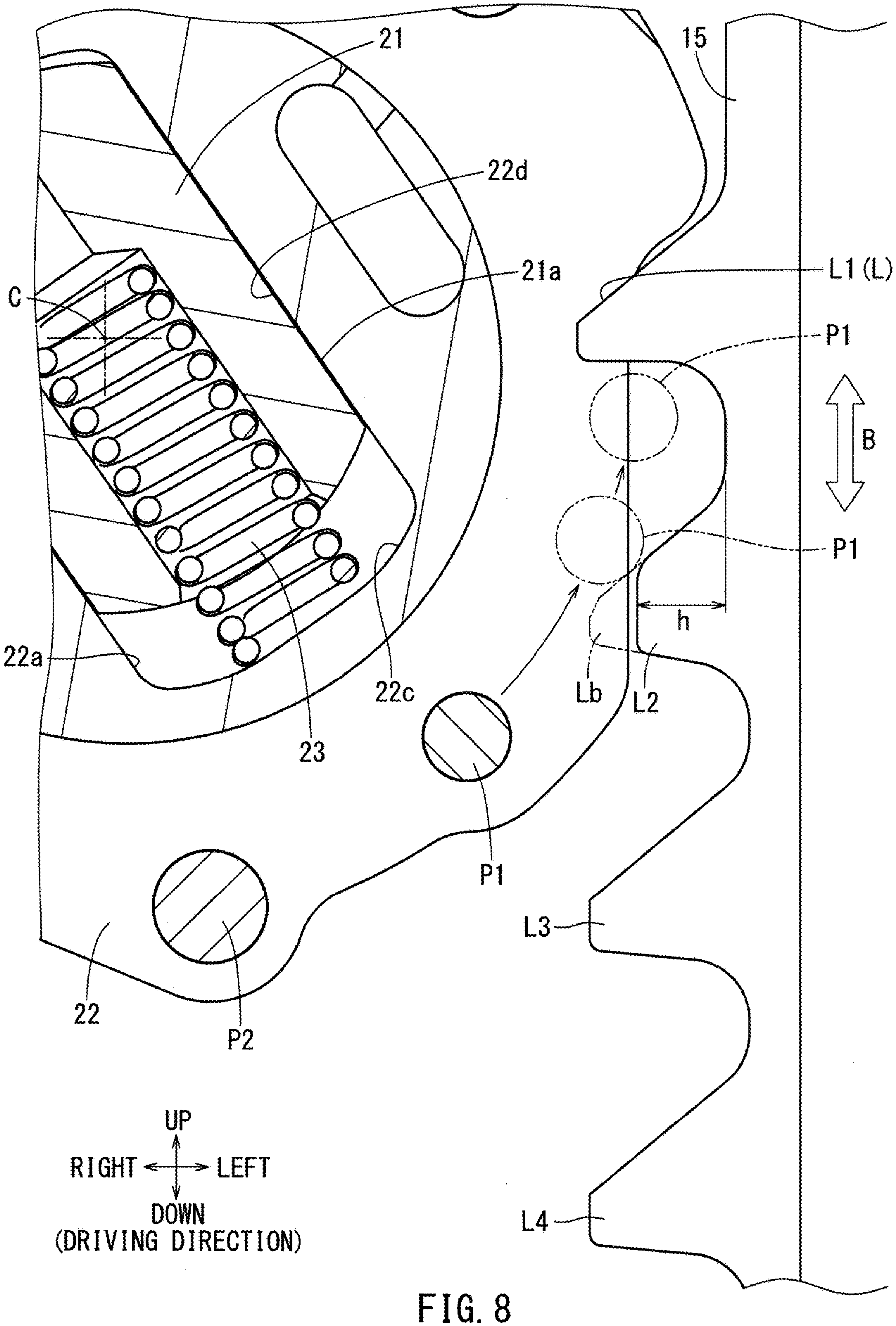
FIG. 8 is an enlarged view of the wheel and the driver, showing a head portion of the second rack tooth is missing to make a height of the second tack tooth lower than that of the other rack teeth.

For another example, as shown in the two-dotted chain line in FIG. 8, by missing a tip end Lb of the second rack tooth L2, a tooth height h of the second rack tooth L2 can be made lower than those of the other rack teeth L. This modifications to the second rack tooth L2 (reduced width or height) further prevent interference or collision of the second rack tooth L2 with the first engaging portion P1 during rebounding motion B of the driver 15. Accordingly, the rapid-fire performance of the driving tool 1 (e.g., the rotational speed of the wheel 22) can be increased without deteriorating durability of the lift mechanism 20 including the wheel 22. It can be configured such that both the upper surface La of the second rack tooth L2 and the tip end Lb of the second rack tooth L2 are missing to avoid interference with the first engaging portion P1.

Various modifications can be made to the driving tool 1 in the present embodiment described above. In the present embodiment, the first engaging portion P1 of the nine engaging portions P is made thinner than the second to the last engaging portions P2 to P9 which are referred to as the standard engaging portions that have the same diameters. However, it may be configured such that three or more engaging portions among the plurality of engaging portions P are referred to as the standard engaging portions and the first engaging portion P1 is thinner than the standard engaging portions. Accordingly, the above-described illustrated configurations can be applied to a case where the wheel 22 includes thinner or thicker engaging portions than the first engaging portion P1 and the three reference engaging portions.

In the above-described embodiment, the driving tool 1 includes the wheel 22 having the nine engaging portions P and the driver 15 having the nine rack teeth L. However, the configuration in which the first engaging portion P1 is thinner than the other engaging portions P can be applied to a case where the wheel 22 having fewer engaging portions P and the driver 15 having fewer rack teeth L.

The hardness of the damper 17 can be adjustable, in the range of (85±5) to restrict a magnitude of the rebounding motion B of the piston 13 and driver 15.

In the present embodiment, for a countermeasure against nail jamming, the wheel 22 is configured to be radially displaceable with respect to the rotation shaft 21 such that the first engaging portion P1 does not interfere with the second rack tooth L2. In such a support structure of the wheel 22, smooth movement of the driver 15 is achieved by displacing some of the engaging portion P of the wheel 22 toward the outer circumference or the inner circumference. In addition to this, the distances between the rack teeth L or groove depths of the rack teeth L can be changed. Instead, a support structure in which the wheel 22 is fixed in the radial direction with respect to the rotation shaft may be adopted. In such a case, a plurality of engaging portions P is arranged at equal intervals on the wheel 22 and a plurality of rack teeth L is arranged at equal intervals on the driver 15 to equally engage the engaging portions P with corresponding rack teeth L for returning the driver 15 in the opposite direction of the driving direction.

Different from the present embodiment, where the support structure is adopted in which the wheel 22 is fixed in the radial direction with respect to the rotation shaft, the first engaging portion P1 can be slightly shifted toward the second engaging portion P2 from the reference position (the position where all engaging portions are arranged at equal intervals on the same circumference) with all engaging portions P having the same thickness, thereby delaying a timing at which the first engaging portion P1 engages the first rack tooth L1. This arrangement also prevents the second rack tooth L2 from interfering with the first engaging portion P1 as a magnitude of the rebounding motion B becomes small.

When all the engaging portions are arranged at equal intervals at the reference positions having the same thickness, a timing at which the first engaging portion P1 engages the first rack tooth L1 can be delayed by chipping off a part of the first engaging portion P1 on a side in the opposite direction of the driving direction. Instead, by chipping off a part of the first engaging portion P1 on a side of the driving direction, the second rack tooth L2 can be avoided from colliding with the first engaging portion P1 from below due to the rebounding motion B. These configurations ensure smooth operation, rapid-fire capacity of the driving tool 1, and durability of the lift mechanism 20 and the reduction gear 40.

We claim:

1. A driving tool comprising:

a piston actuatable by gas pressure to move in a driving direction;

a driver coupled to the piston to move therewith to drive a driving member;

a plurality of rack teeth disposed on the driver along the driving direction;

a wheel having a plurality of engaging portions, the wheel configured to reposition the driver in a direction opposite to the driving direction by sequentially engaging the plurality of engaging portions with corresponding rack teeth during rotation of the wheel; and a damper that the piston contacts at a lower moving end of the piston, wherein the plurality of engaging portions includes a first engaging portion and three or more reference engaging portions thicker than the first engaging portion, the first engaging portion configured to engage a first rack tooth located outermost in the direction opposite to the driving direction among the plurality of rack teeth, the first engaging portion engages the first rack tooth after cessation of a rebounding motion moving in the direction opposite to the driving direction due to collision with the damper, and the first engaging portion has a diameter configured to prevent interference with a second rack tooth, located adjacent to the first rack tooth in the driving direction, during the driver's movement opposite to the driving direction.

2. The driving tool according to claim 1, wherein, the plurality of engaging portions includes a last engaging portion configured to engage a last rack tooth located outermost in the driving direction, the wheel includes a relief portion along a circumferential direction of the wheel between the first engaging portion and the last engaging portion, the relief portion allowing the driver to move in the driving direction, and the relief portion's angle range is greater than an angle permitting driver movement in the driving direction but less than 110° around a rotational axis of the wheel.

3. The driving tool according to claim 1, wherein the wheel includes five to ten engaging portions.

4. The driving tool according to claim 1, wherein the wheel rotates 3.5 to 7 revolutions per second.

5. The driving tool according to claim 1, wherein the damper is made of rubber with durometer hardness of 85±5.

6. A driving tool comprising:

a piston actuatable by gas pressure to move in a driving direction;

a driver coupled to the piston to move therewith to drive a driving member;

a plurality of rack teeth disposed on the driver along the driving direction; and a wheel having a plurality of engaging portions, the wheel configured to reposition the driver in a direction opposite to the driving direction by sequentially engaging the plurality of engaging portions with corresponding rack teeth during rotation of the wheel, wherein the plurality of engaging portions includes a first engaging portion and three or more reference engaging portions thicker than the first engaging portion the first engaging portion configured to engage a first rack tooth located outermost in the direction opposite to the driving direction among the plurality of rack teeth, the driver includes a second rack tooth adjacent to the first rack tooth on a side in the driving direction, and a tooth width of the second rack tooth is reduced by removing a part of the second rack tooth on a side opposite to the driving direction.

7. The driving tool according to claim 1, wherein, the driver includes a second rack tooth adjacent to the first rack tooth on a side in the driving direction, and a tooth height of the second rack tooth is lower than that of other rack teeth.

8. The driving tool according to claim 1, wherein the plurality of rack teeth of the driver is spaced apart from each other at equal intervals along a longitudinal direction of the driver and the plurality of engaging portions of the wheel is spaced at equal intervals around an outer circumferential edge of the wheel.

9. A driving tool comprising:

a piston actuatable by gas pressure to move in a driving direction;

a driver coupled to the piston to move therewith to drive a driving member;

a plurality of rack teeth disposed in a longitudinal direction of the driver along the driving direction;

a wheel having a plurality of engaging portions along an outer circumferential edge of the wheel, the wheel configured to reposition the driver in a direction opposite to the driving direction by sequentially engaging the plurality of engaging portions with corresponding rack teeth during rotation of the wheel; and a damper that the piston contacts at a lower moving end of the piston, wherein the wheel includes a relief portion having no engaging portion, enabling driver movement in the driving direction, the plurality of engaging portions include a first engaging portion configured to engage a first rack tooth located outermost in the direction opposite to the driving direction among the plurality of rack teeth, the first engaging portion having a smaller diameter than other engaging portions, the driver includes a second rack tooth adjacent to the first rack tooth on a side in the driving direction, and a tooth width of the second rack tooth is reduced by removing a part of the second rack tooth on a side opposite to the driving direction.

10. The driving tool according to claim 9, wherein the wheel includes five or more engaging portions.

11. The driving tool according to claim 9, wherein the wheel rotates preferably about 3.5 to 7 revolutions per second.

12. The driving tool according to claim 9, wherein a tooth height of the second rack tooth is lower than that of other rack teeth.

13. The driving tool according to claim 9, wherein the damper is made of rubber with durometer hardness of 85±5.

14. The driving tool according to claim 9, wherein the relief portion's angle range is greater than an angle permitting driver movement in the driving direction but less than 110° around a rotational axis of the wheel.

15. The driving tool according to claim 9, wherein the first engaging portion engages the first rack tooth after cessation of a rebounding motion moving in the direction opposite to the driving direction due to collision with the damper.

16. The driving tool according to claim 9, wherein the wheel is radially displaceable relative to a rotational axis of the wheel, and some of the plurality of engaging portions are configured to be offset either toward an outer circumferential side or an inner circumferential side relative to a common circumference of an imaginary circle around the rotational axis of the wheel, in accordance with the radial displacement of the wheel.

17. The driving tool according to claim 9, wherein the wheel is radially fixed to a rotation shaft of the wheel.

* * * * *